Jan. 28, 1964  C. O. GLASGOW ETAL  3,119,674
METHOD AND APPARATUS FOR PRODUCING OIL AND GAS WELLS
Filed May 13, 1960  5 Sheets-Sheet 1

INVENTORS
CLARENCE O. GLASGOW
ROBERT W. COGGINS
BY
*Arthur L. Wade*
ATTORNEY

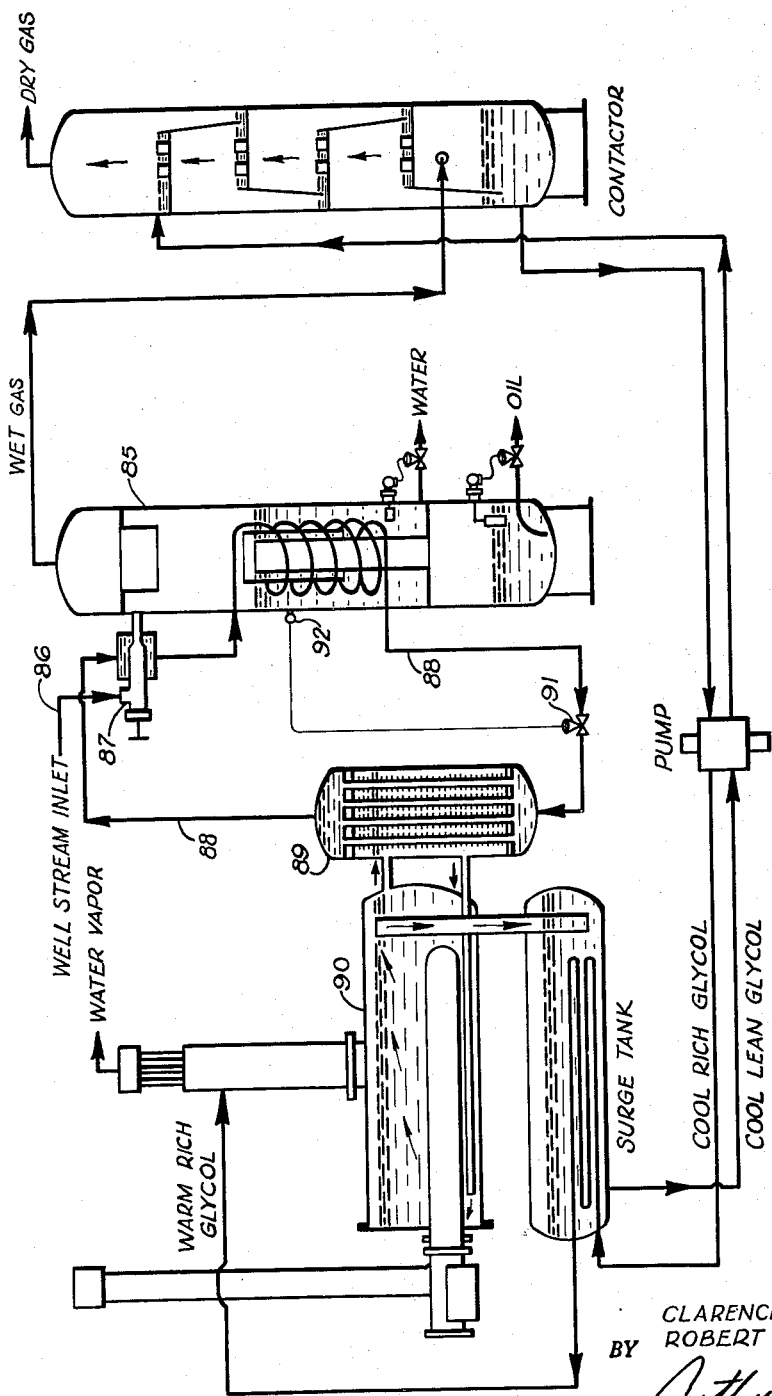

# United States Patent Office 3,119,674
Patented Jan. 28, 1964

3,119,674
METHOD AND APPARATUS FOR PRODUCING OIL AND GAS WELLS
Clarence O. Glasgow and Robert W. Coggins, Tulsa, Okla., assignors to National Tank Company, Tulsa, Okla., a corporation of Nevada
Filed May 13, 1960, Ser. No. 28,988
5 Claims. (Cl. 55—20)

The present invention relates to a method and apparatus for heating the production of predominantly gaseous hydrocarbon wells in field processing the production as it is taken to pipelines of purchasers. More specifically, the invention relates to a method and structure for applying the heat of a separate heat exchange fluid at substantially atmospheric pressure to the fluids of a predominantly gaseous hydrocarbon well stream to further the separation of the fluids.

The prior art teaches that low temperature separation of distillate and water from relatively high pressure well streams, the well stream may be heated by a gas-fired heater and passed through a separate high-pressure knockout vessel before having its pressure reduced in the so-called low temperature separation process in which a liquid bath within the vessel is arranged to catch and melt the hydrates formed. The liquid bath in which the hydrates are melted is heated by either the hot well stream before its pressure is reduced or a separate source of heat.

The prior art also teaches that steam has been used in coils immersed in the liquid bath to bring the bath temperature up to its desired level for melting hydrates. The entire low temperature separator has also been enclosed within the shell of an indirect heater to apply heat at the required locations within the separator.

However today there are also an ever increasing number of wells which do not warrant the use of the low temperature separation process. Also, the low temperature separation arrangements are expensive and difficult to operate. Also, the payout in liquid recovery has often been difficult to obtain, and may be impossible to obtain as the native pressure of the well declines. These wells may produce only 3 to 10 barrels of storage tank hydrocarbon liquid per million cubic feet of gas. Nevertheless, this well production must be separated into gas, liquid, free water, foreign matter, and distillate before the gas is delivered to a purchasing pipeline. A separator is used, and there is the problem of economically heating the liquids in the separator, and the gas produced into the separator. Also, freezing of the water that is separated from the liquids must be circumvented and the gas must be kept above the hydrate point as its pressure is reduced to pipeline pressure under the operating conditions of this separation. The present invention solves these heating problems with an inexpensive, dependable, maintenance-free, rugged, heating system for a regular production separator which requires a minimum of attention from an operator.

A principal object of the invention is to provide a heating system operating at substantially atmospheric pressure including thermosiphonic liquid flow through a separator vessel into which a well stream is produced.

Another object is to automatically control the circulation of an independent heat exchange liquid flowed thermosiphonically through a separator in which a well stream is processed.

Another object is to apply the heat of an automatically circulated heat exchange liquid through a field separator to selected portions of separated fluids.

The present invention contemplates a combination of a separator for well fluids and a heater independently operated at substantially atmospheric pressure to thermosiphonically circulate heat exchange liquid through a conduit system extended through the separator vessel.

The invention further contemplates a heat exchanger incorporated within the heater, which heater is operated at substantially atmospheric pressure in preheating the entire well stream flowing through the heat exchanger and produced into the separator vessel, the amount to prevent subsequent hydrate accumulation in the gaseous portion of the well stream.

The invention further contemplates a conduit system bringing the heat exchange liquid to the separator and the conduit system including a jacket mounted on the separator wall in its circuit, the jacket being placed in relation to the water separated from the well stream liquids within the vessel so as to flow heat from the heat exchange liquid into the water.

The invention further contemplates a valve being placed in the conduit system and operated to control the thermosiphonic circulation of the heat exchange liquid through the conduit system to heat only the separated liquids the amount to prevent freezing of the water in the separated liquids.

The invention further contemplates a barrier structure within the conduit system to prevent continued thermosiphonic circulation of the heat exchange liquid within that portion of the conduit system in the separator vessel while the control valve in the conduit system is closed.

Other objects, advantages and features of this invention will become apparent to one skilled in the art upon consideration of the written specifications, appended claims, and attached drawings wherein:

FIG. 5 is similar to FIG. 4 with the heated glycol applied to heat exchanging with a liquid which is directly applied to heating the liquids of a field separator.

Figure 1:
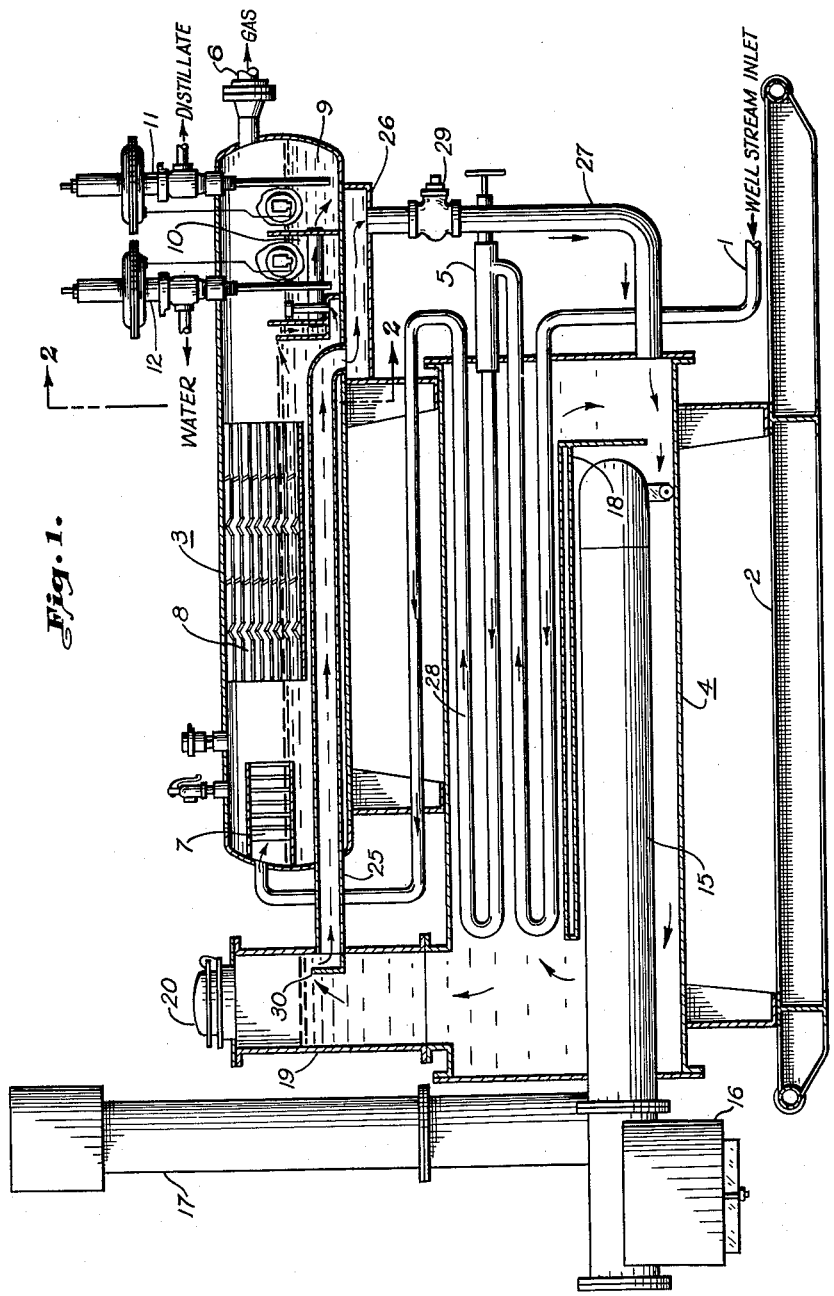
FIG. 1 is a side elevation of a fully sectioned, somewhat diagrammatic, complete field production unit embodying the present invention.
Figure 2:
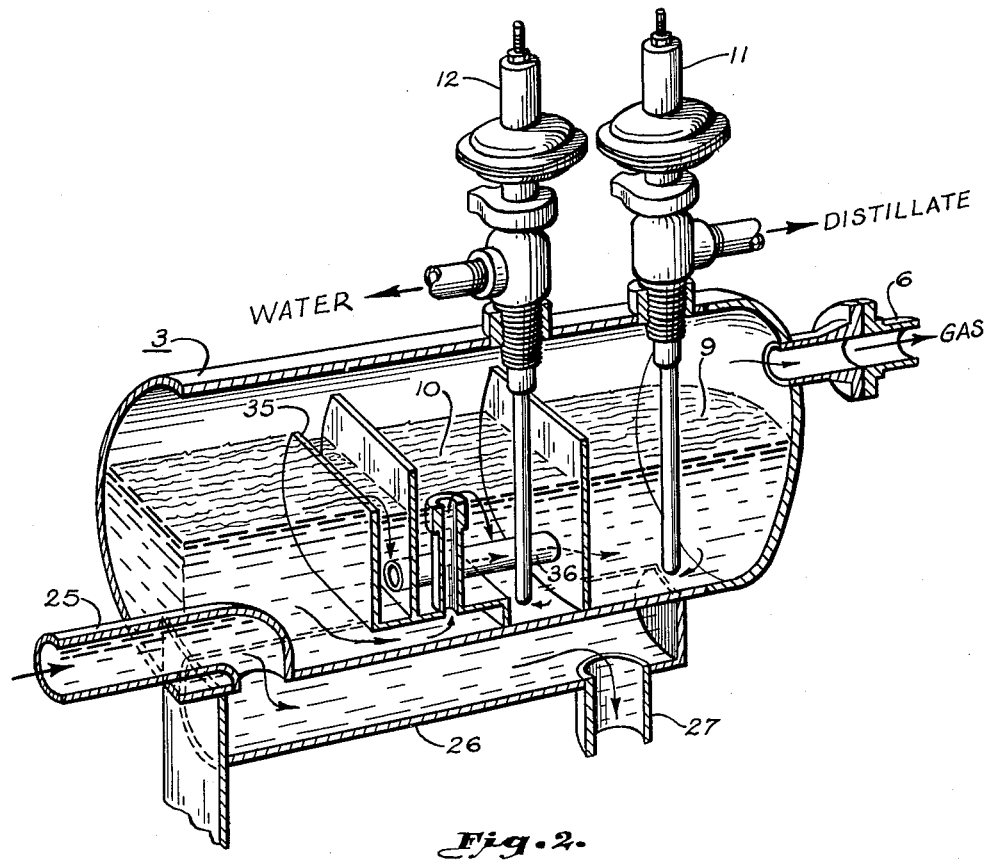
FIG. 2 is a perspective section along lines 2—2 in FIG. 1, showing the relation of the heat exchange jacket to the separator.

Referring to FIGS. 1 and 2, there is illustrated a complete field production unit for a predominantly gaseous stream of hydrocarbon wells. The structure is illustrated as skid-mounted and pre-piped for delivery to the well site, ready for use. So packaged, the foundation requirements for the units at the well site are a minimum. Further, the unit may be readily moved elsewhere as operating conditions in the field change.

Once installed, the unit illustrated is easily started up by one man. The over-all arrangement permits readjustment and service on each individual component of the unit. The controls are reliable, standard, components which are stocked in local warehouses of the manufacturer of the unit.

The stream of fluids from the well is brought to the unit with conduit 1. Mounted on kid 2 is a separator 3 adapted to receive the well stream of conduit 1 with the capacity required for separation between the gaseous portion of the well stream and the liquids of the stream. A heater 4 is also mounted on skid 2, but separate from separator vessel 3. Heater 4 functions to raise the temperature of heat exchange liquid to a predetermined value. A conduit system is then arranged between the seperator vessel 3 and heater 4 to provide for thermo siphonically circulating the hot heat exchange liquid that it might deliver its heat to only the well stream liquids collected in the separator vessel 3.

Separator 3

Separator 3 is illustrated as a three-phase production vessel receiving the well stream of conduit 1. A choke 5 is included in conduit 1 for reducing the pressure of the well stream to the pressure within the separator. As the separator normally delivers gas to a purchasing pipeline through conduit 6, it operates at the pressure of the pipeline.

The separator internals include a rat trap 7 upon which the well stream directly impinges. The gaseous phase of the well stream then passes through spaced plates 8 disclosed in Dixon 2,349,944. The liquids of the well stream collect in the first part of separator 3, beneath plates 8, and stratify into oil and water. The oil is flowed into the far end of separator 3, within a chamber 9. The water is flowed into chamber 10, intermediate chamber 9 and the left end of the separator 3. From their separate compartments, the oil is drawn off through valve 11 and the water is drawn off through valve 12.

The present invention places heat on-demand in the base of the separator to prevent the water from freezing and to further oil stabilization to some degree. In the conduit system provided, the present invention utilizes the thermosiphonically circulated heat exchange liquid as the source of heat for at least these two heating functions.

Heater 4

Within heater 4, a reservoir of liquid is brought to the desired temperature level by gas-firing a tube mounted in heater vessel 4. The fuel system for heater tube 15 is not illustrated. The air of combustion is supplied through a flame arrestor 16, one form of which is disclosed in U.S. application 863,234, filed December 31, 1959, by Clarence O. Glasgow. The products of combustion in heater tube 15 are discharged through stack 17.

The general structure of heater 4 is disclosed in at least Walker 2,354,932. This unit is termed an indirect heater for the reason that a directly fired tube brings the temperature of a reservoir of heat exchange liquid up to a certain level and streams to be heated are brought up to temperature by direct heat exchange with this heat exchange liquid. Baffle structure 18 is a characteristic of this patented heater. Baffle 18 is mounted above firetube 15 and functions in developing circulation of the liquid within heater shell 4.

The particlular form given this indirect heater in the present disclosure includes a reservoir column 19 for elevating the heat exchange liquid within heater 4 to a level a finite distance above the conduit system connecting heater 4 and separator 3. Aside from the temperature control advantage exerted over thermosiphonically circulated heat exchange liquid from the heater 4, the heater is relatively inexpensive as it need only to be constructed sturdy enough for atmospheric pressure operation. In evidence of the simplicity of construction, simple fill hatch 20 is employed through which heat exchange liquid is replenished at atmospheric pressure.

The Conduit System Between Heater and Separator

The conduit system between heater 4 and separator 3 is illustrated as comprised of conduit 25, jacket 26 and conduit 27. Heat exchange liquid from reservoir column 19 flows along path-conduit 25 while heat exchanging with the stratifying liquids of the well stream in the front and lower part of separator vessel 3. Conduit 25 communicates with jacket 26, which jacket is mounted on the external shell of separator 3. Conduit 27 communicates with jacket 26 in drawing the heat exchange liquid down to the lower portion of heater shell 4.

In function, the heated liquid from heater 4 rises in reservoir column 19, passes along conduit 25, flows into and through jacket 26 and completes its circuit by downward flow through conduit 27. As the heated liquid of reservoir column 19 is reduced in temperature while passing through conduits 25 and jackets 26, the heat exchange liquid flows down conduit 27 to be reheated by tube 15 in heater shell 4. The heat exchange liquid in this conduit system between separator 3 and heater 4 flows under thermosiphonic power. This circulation continues automatically, under thermosiphonic force, as heater tube 15 continues to deliver heat to only the separated liquid within shell 4

Heat Exchange Liquid

The heat exchange liquid is desirably water. However, when the unit is shut down, relatively pure water would freeze in ambient temperatures often encountered. Therefore, anti-freeze compounds, such as glycol, can be added to the water to prevent it freezing during periods of shut down in cold climates.

The invention contemplates other liquid media being adequate for this purpose. The reconcentrated glycol of a liquid desiccant system for gas produced by the unit can be utilized. The basic concept of the invention includes any one of a number of liquid media being brought to a predetermined temperature at substantially atmospheric pressure to be thermosiphonically circulated through a separator for a hydrocarbon well stream in order to bring heat on-demand to selected portions of the separator as reqiured to satisfactorily produce the components of the well stream to purchasers of the oil and gas.

Miscellaneous Features

It is often desirable to supply a certain amount of heat to the entire well stream in conduit 1 before its pressure is reduced, or after its pressure is reduced. Where a pressure reduction is taken in the well stream, the adiabatic cooling which results always brings the danger of hydrate formation within conduit 1. Therefore, a part of conduit 1 is illustrated as mounted within the shell of heater 4 in coils, or reaches 28. It will be subsequently taught in this disclosure that only selected portions of the well stream need be diverted through heat exchange conduit, such as coils 28, to bring the entire well stream to a temperature desired as it is introduced into the front portion of separator 3.

The flow of heat exchange liquid through the conduit system, including conduit 25, jacket 26 and conduit 27, powered by thermosiphonic action, must be controlled. Valve 29 is placed in conduit 27 to illustrate a simple means of exerting control by flow restriction. In FIG. 1, valve 29 is simply illustrated as a manually controlled plug valve. Manual control of this valve, with intermittent settings, may well be adequate for a wide variety of applications. On the other hand, it will be subsequently illustrated how control of a valve in the conduit system may be automatic and continuous from a system sensitive to the temperature of the liquids being heated by the heat exchange liquid of the conduit system.

It should be pointed out from the foregoing that these separate introductions of heat into the entire well stream, and into only the liquids separated from the well stream, permit the establishment of different, and independent, temperatures for gas and liquids within the separator. The heating of the entire well stream, as desired, enables the operator to control the temperature of the separated gas so as to avoid the aforementioned hydrate formation. The heating of the separated liquids of the well stream, by the thermosiphonic flowing hot liquid, enables the operator independently to attain the temperature desired to avoid freezing of these liquids.

Another element of heat exchange liquid flow control centers around the structure of dam 30, mounted in reservoir column 19. Conduit 25 communicates through the side of reservoir column 19, and dam 30 is, structurally, in the form of an open-topped trough extended from below the opening through the reservoir column 19 wall. The liquid in reservoir column 19 is carried well above the upper lip of dam-trough 30. In function, rising heat exchange liquid in reservoir column 19, heated by tube 15, flows over the top of dam 30 and down into conduit 25. When valve 29 is shut, or firetube 15 is turned off, dam 30 prevents continued circulation of heat exchange liquid to and from conduit 25.

The control exerted by dam 30 is positive and simple. With the combustion terminated in heater tube 15, or with valve 29 closed, the liquid in conduit 25 will continue delivering its heat to well stream liquids in separator 3. If dam 30 were not in place, the cooling heat exchange liquid in conduit 25 would sink to the bottom of conduit 25 and flow back into reservoir column 19. With hot heat exchange liquid in reservoir column 19, the flow of this liquid would be directed up conduit 25 in countercurrent flow to the cooling liquid within the conduit 25. Under the condition of no structure available, similar to dam 30, the heat exchange liquid of heater 4 in reservoir column 19 would continue to deliver heat to the base of the separator after valve 29 has closed and after heater 15 has ceased to function. Dam 30 solves this problem of heat control by positively preventing the flow of heat exchange liquid between conduit 25 and heater 4 when valve 29 is closed or when tube 15 is shut down.

Heat Exchange Jacket

FIG. 2 illustrates that portion of separator shell 3, on which jacket 26 is mounted, in somewhat more detail than FIG. 1. Cold-weather operation of the unit has been carefully considered in grouping the components as illustrated in FIG. 2.

Conduit 25 is arranged to heat the base of the separator and therefore the free water collecting in the base. The oil above this water is skimmed over the upper edge of baffle 35 and conducted through pipe 36 into compartment 9 of separator 3. Non-freeze valve 11 draws this oil to storage for eventual sale.

The baffle arrangement defining compartment 10 isolates the compartment 10, in large measure, from direct exposure to the ambient temperature. Compartment 10 is located between compartment 9 and the stratifying liquids in the first part of separator 3. Non-freeze valve 12 draws this collecting water from compartment 10 to a point of disposal. Jacket 26 is a simple shell mounted on the outside, lower, wall of separator 3 to span the longitudinal dimension of compartment 10. Hot heat exchange liquid from conduit 25, in jacket 26, introduces heat directly into this collection of water in compartment 10 to prevent its freezing under low ambient temperatures. In this manner, the heat exchange liquid system directs heat to this selected location in separator 3.

Low Temperature Dehydration Operation

Figure 3:
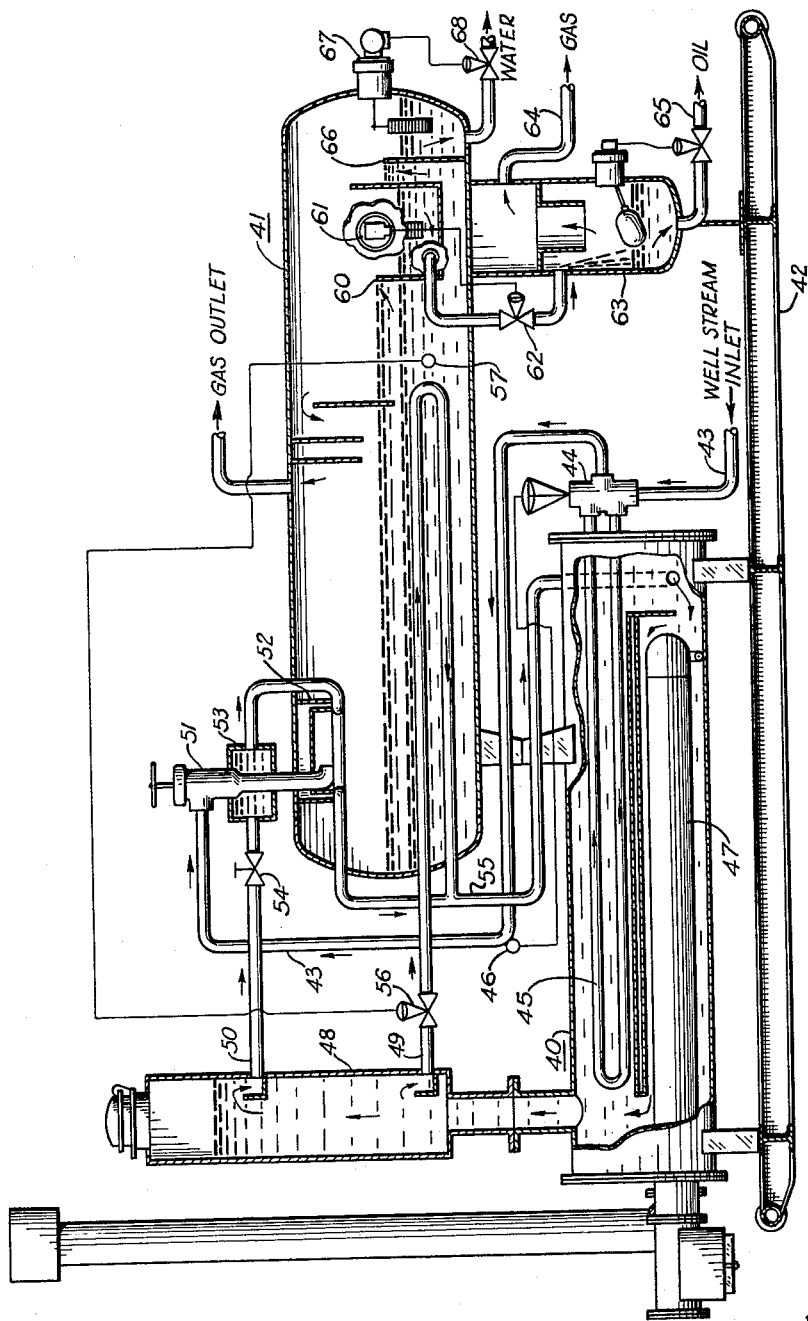
FIG. 3 is a system similar to FIG. 1 with the circulated heat exchange liquid also applied to heating the choke of the well stream.

Referring now to FIG. 3, there is illustrated a heater 40 operating under the principles of the present invention to supply heat to a separator 41. Separator 41 is operated under principles disclosed in Walker et al, 2,747,002.

Separator 41 is operated as a horizontal form of low temperature dehydrator to give effective separation of the various well fluid components. In some respects the separator 41 is similar to the production separator 3 of FIG. 1. However, the well stream is choked directly into the shell of separator 41 to form hydrates which will be melted in a warm liquid bath in the base of the separator. The three phases of the well production are then separated and removed from the shell to separate points.

Control of the operation of low temperature separator 41 is more critical than the control required for production separator 3. Hydrates are deliberately, and continuously, formed in the gas space above the liquid bath in the base of the separator. Therefore, no internal structure, such as plates 8, can be utilized in separator 41 because hydrates will collect on them and impede the passage of the gaseous phase through the vessel 41. The coke structure across which the large pressure drop is taken by the well stream must be carefully controlled in temperature to prevent freezing of the stream from the large cooling effect brought about by the pressure drop. The present invention, with its concept of utilization of heat exchange liquid, provides the selective heating within low temperature separator 41 as well as the carefully regulated heating of the well stream as it is brought to the choke.

The heater 40-separator 41 combination is mounted on skid 42 with all of the advantages of the compact assembly of FIG. 1.

Heater 40

Conduit 43 brings the predominantly gaseous stream of a hydrocarbon well to splitter valve 44. Splitter valve 44 is regulated to determine that portion of the stream in conduit 43 which is passed to heat exchange coil 45. The temperature in conduit 43 is sensed at 46 and develops a control signal for valve 44 to maintain a temperature set point of the well stream in conduit 43 prior to the stream entering the choke.

Heater exchange coil 45 is mounted within the heat exchange liquid within the shell of heater 40. As in FIG. 1, the heat exchange liquid of heater 40 is brought up to predetermined temperature by fire tube 47. The arrangement of a control system responsive to the temperature of the bath is readily understood by those skilled in the art without specific illustration to needlessly encumber the present disclosure.

In general, the internal structure of heater 40 follows that of heater 4 in FIG. 1. However, a reservoir column 48 is mounted on the top of shell 40 with enough height to provide a plurality of heat exchange liquid flows therefrom. Conduit 49 supplies a first flow of the heat exchange liquid to the base of separator 41, and conduit 50 supplies a second flow of the heat exchange liquid to a heat exchange jacket about the choke reducing the pressure of the well stream of conduit 43. The level of liquid in reservoir column 48 is carried well above the highest point in this conduit system in order that heated heat exchange liquid will thermosiphonically circulate therethrough.

Low Temperature Separator 41

Mounted through the wall of the shell of separator 41 is a choke 51 receiving the predominantly gaseous well stream of conduit 43 and reducing its pressure into the shell of separator 41. The drop of pressure across this choke depends, of course, on the particular native pressure available at the hydrocarbon well as a source for the stream of conduit 43. In these low temperature separator installations the well stream will approach the choke at pressures of thousands of pounds per square inch. This stream is choked down to pressures of only hundreds of pounds per square inch, depending upon the pressure of the pipeline supplied the separator products.

As explored in detail, by the disclosure of Walker et al. 2,474,002, the well stream from choke 51 is preferably deflected by a structure generally indicated at 52. This structure deflects the choked well stream and the hydrates forming therein are dropped into the relatively warm bath of well fluids below the deflector 52. Obviously, both choke 51 and deflector 52 must be carefully controlled in temperature to avoid the hydrates of the choked well stream building up on the structures and limiting the well stream throughput.

Conduit 50 is brought to jacket 53 for specifically maintaining the temperature of the choke at a desired level. Diagrammatically illustrated, conduit 50 extends from jacket 53 and to deflector 52 to maintain it at a desired temperature which will prevent hydrates build up. Flow of the heat exchange liquid through conduit 50 is shown as regulated by valve 54 which is manually positioned. Obviously, it is possible to regulate this valve automatically from a selected temperature. The temperature may be that within conduit 50 itself, jacket 53, or some other point which will insure the jacket 53 and deflector 52 being maintained at their desired temperatures.

The bath of well liquids maintained in the first part of separator shell 41 is heated by the heat exchange liquid drawn from reservoir column 48 by conduit 49. Conduit 49 is diagrammatically illustrated as extended in a return-bend within these liquids, joining conduit 50 in conduit 55. Conduit 55 recombines the heat exchange liquid of conduits 49 and 50 to drop them back to the bottom of heater shell 40 for reheating to complete the cycle of thermosiphonic circulation. In this manner, control of the flow through conduit 49 is illustrated by valve 56, regulated from a temperature responsive control system sensitive to the temperature of the liquid bath at 57. In this manner, heat may be selectively applied to at least three locations associated with separator 41 for control of temperature by use of thermosiphonically circulated heat exchange liquid from heater 40.

*Heat Exchange Liquid Versus Steam*

The advantages of using heat exchange liquid for selective heating has been previously developed to some extent. Steam has been utilized for the same general purpose. Steam will supply enough heat to accomplish the heating desired, however, the control of steam is far from simple when compared to the control of thermosiphonically circulated heat exchange liquid. A completely filled liquid system has no air locking problems. The atmospheric pressure operation of a liquid heater is much cheaper and simpler than the operation of a steam generator. From a control standpoint, steam has a "lag" in its application of heat which can be very undesirable. Once the control point of temperature has been reached by the application of steam, the control system calls for termination of the heating but the steam continues to condense and inject heat at the point to which the control system is sensitive. Additionally, there is the danger, with steam, that when a coil 45 fails within a steam generator an explosion will result. In the present heater 40, a failure of heat exchange conduit 45 will merely blow the liquid from the atmospheric pressure-operated heater 40 without the danger of an explosion. Thus, with the present system, the operation of a low temperature separator is greatly improved by the efficiency with which the liquid bath may be brought to the desired temperature for hydrate melting without exceeding the desired temperature and wastefully heating the gas produced from the separator.

*Additional Features of the FIG. 3 Unit*

Back-flow dam structures are provided for conduits 49 and 50, similar to dam 30 of FIG. 1. The flow of liquid to the conduits 49 and 50 is, therefore, directly dependent upon a continual supply of heat to the liquid in heater 40. The heated liquid, rising in reservoir column 48, flows over the dams in parallel to flow through conduits 49 and 50. With valves 54 and 56 regulating the liquid flow in conduits 49 and 50, the thermosiphoning within these conduits continues to bring heated liquid to choke jacket 53, deflector 52, and that portion of conduit 49 within the liquid bath of separator vessel 41. However, should these valves 54, 56 be open and the fire within tube 47 out, the continual delivery of heat exchange liquid to these components will be automatically terminated by the dam structures within reservoir column 48.

The thermosiphoning force for liquid circulation is not solely dependent upon the heat delivered to the heat exchange liquid. The height of the location at which heat is delivered by the liquid is also a factor. Therefore, the separator is mounted above the heater so the force of the cooled liquid will be increased to aid in the thermosiphonic action within the conduit system.

Oil-skimming trough 60 is provided within the shell of separator 41 for collecting the oil stratified on the top of the elongated liquid bath in separator 41. Float control 61 is provided to maintain a predetermined level of the oil in trough 60 while controlling valve 62 through which the oil is discharged into separator 63 at a pressure lower than the pressure in separator shell 41.

The gases evolved in separator 63 may be valved from the separator shell through conduit 64. There may be a sale for this gas, or it may be simply vented. The liquid collecting in the bottom of separator 63 is controlled to a predetermined level by discharge of the oil to storage through conduit 65.

Water stratified beneath the oil in separator shell 41 is flowed beneath trough 60 and over weir 66 into the end of separator shell 41. Float control 67 controls valve 68 in discharging the water to a disposal point.

*Glycol as Heat Exchange Liquid*

Figure 4:
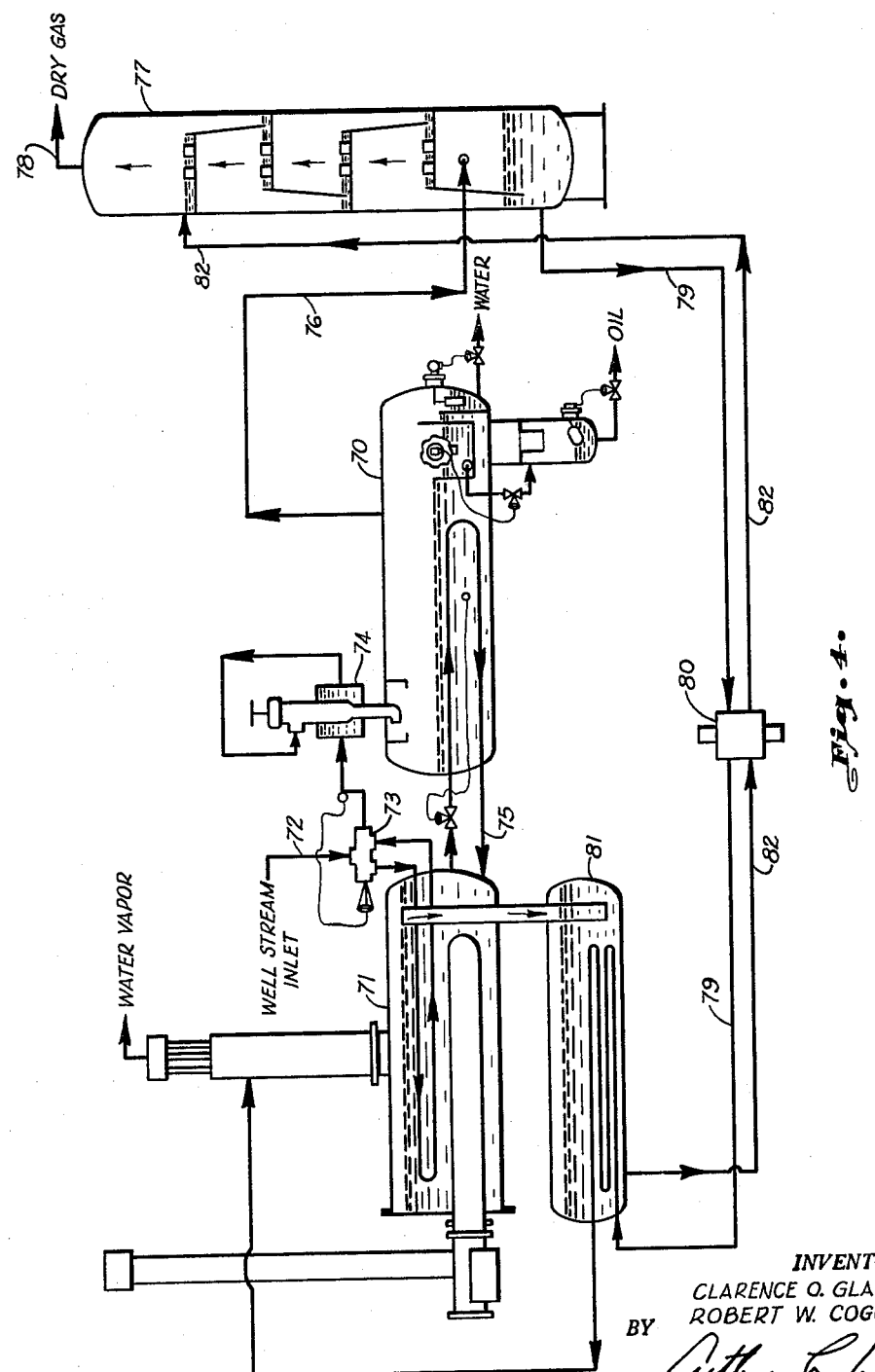
FIG. 4 is a somewhat diagrammatic, sectioned, side elevation of a separator and glycol dehydration system embodying the present invention.

Under the concept of the present invention, water is only one of various satisfactory liquids which can be thermosiphonically circulated to maintain the temperatures associated with a separator vessel within desirable ranges. The reconcentrated glycol from a system for dehydrating gas may be also employed. In FIG. 4, there is illustrated a possible arrangement for bringing heated glycol into heat exchange with a separator liquid bath.

The specific arrangement of the components may be a choice of design. In FIG. 4 separator vessel 70 is diagrammatically illustrated in substantially the same horizontal plane as glycol reconcentrator 71. The well stream is brought to the system through conduit 72 and a portion of it split into a heat exchange coil in reconcentrator 71 by valve 73. Valve 73 is indicated as generally controlled by the temperature of the well stream downstream of valve 73 and upstream of choke jacket 74.

The well stream of conduit 72 may be introduced into separator 70 as illustrated in FIG. 1 or in FIG. 3. However introduced, the well stream has its temperature controlled by the heat of the glycol in reconcentrator 71.

To utilize the heating potential of the reconcentrated glycol in reconcentrator 71, a conduit 75 is illustrated as extending from reconcentrator 71 into the horizontal liquid bath in the base of separator 70. Conduit 75 takes the hot glycol from the upper portion of reconcentrator 71 at an elevated temperature, delivers its heat to liquid bath, and returns the glycol to the bottom portion of reconcentrator 71 at a reduced temperature. The result is thermosiphonic flow of the glycol through conduit 75 to maintain a desired temperature within the liquid bath within separator 70. The temperature of the liquids within separator 70 are indicated as controlling a valve in conduit 75 to exercise control over the amount of glycol allowed to circulate in conduit 75.

The gas from separator 70 is drawn off by conduit 76 to the bottom of contactor tower 77. Within contactor tower 77, the gas from conduit 76 is flowed upward while reconcentrated glycol is flowed downward, over a series of contact trays. The dehydrated gas is then removed from tower 77 through conduit 78.

The wet glycol is removed from the bottom of tower 77 by conduit 79 and returned to reconcentrator 71 with pump 80. The reconcentrated glycol of surge tank 81 is also pumped by pump 80 to the top of contactor tower 77 through conduit 82. Thus, quite diagrammatically, is ilustrated the essential components of a liquid desiccant system employing liquid glycol for dehydrating the gas removed from separator 70. In the process of regenerating this liquid glycol, it is passed through the liquid bath of separator 70 in heat exchange relationship, powered by thermosiphonic force. Additionally, the heat of the reconcentrated liquid glycol is utilized for bring the well stream to a suitable temperature for passing through the choke heated by the jacket 74. The basic concept of utilizing the thermosiphonic flow of heated heat exchange liquid for developing and maintaining a field separator at a desired temperature is embodied in this disclosure.

Indirect Heating of a Separator by Glycol

FIG. 5 is presented to demonstrate how heat may be indirectly transferred from reconcentrated glycol to a field separator. Essentially, it is contemplated that a heat exchanger be provided to utilize the hot liquid glycol to elevate the temperature of a separate, thermosiphonically circulated, heat exchange liquid to the separator.

The form of separator indicated at 85 has its longitudinal axis vertically extended. The internal structure of this vertical form of separator is basically that of the horizontal form of the preceding disclosure. A well stream is indicated as brought to the separator through conduit 86, passing through choke 87. The choke may be heated under any of the other forms previously illustrated. The temperature of the separator liquid bath is maintained with heat exchange conduit 88. Conduit 88 is illustrated as connected to the tube side of a heat exchanger 89. Reconcentrated glycol from reconcentrator 90 is circulated through the shell side of the heat exchanger 89.

The essential elements of the inventive concept are found in this system illustrated in FIG. 5. The hot glycol of reconcentrator 90 is utilized to elevate the temperature of a separate liquid heat exchange medium in conduit 8. The heat exchange liquid may be water, elevated to a temperature less than that at which vaporization occurs. Alternately, the water of conduit 88 may be vaporized to steam which will give up its heat of vaporization to the liquids of separator 85.

To control a liquid heat exchange medium in conduit 88, valve 91 is indicated as regulated from thermoresponsive element 92. Element 92 being responsive to the liquid bath of separator 85, heated by coil 88, the circulation of liquid in conduit 88 is regulated to maintain the temperature of the bath. Obviously the control of liquid in conduit 88 and glycol flow between reconcentrator 90 and heat exchanger 89 can be more elaborate than illustrated. If the liquid of conduit 88 is heated hot enough to vaporize, the control of its flow to separator 85 would be by one segment while the control of condensed liquid to exchanger 89 would be by a second segment of a control system. However, for the purpose of the present disclosure, the regulation of the flowing mediums is sufficiently illustrated to attain the objects of the present invention.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of producing a predominantly gaseous hydrocarbon high pressure well stream to pipe line pressure including,
   heating a reservoir of heat exchange liquid,
   placing the well stream and reservoir liquid in indirect heat exchange,
   controlling the indirect heat exchange between the well stream and reservoir liquid to prevent subsequent substantial hydrate formation in the gaseous portion of the well stream when the pressure of the well stream is reduced to pipe line pressure,
   reducing the high pressure of the well stream to pipe line pressure,
   introducing the well stream at pipe line pressure into a separator vessel providing the capacity in which separation of the stream into a gaseous portion and a liquid portion containing water takes place,
   passing heated liquid of the reservoir through a continuous closed circuit in indirect heat exchange which is restricted to the separated liquid portion containing water in the lower portion of the separator vessel with the force of thermosiphonic circulation,
   controlling the heat exchange between the thermosiphonically circulated liquid and the liquid portion to prevent freezing the water in the liquid portion,
   and separately removing the liquid portion and the gaseous portion from the separator vessel.

2. A system for producing a predominantly gaseous hydrocarbon high pressure well stream to pipe line pressure including,
   a reservoir of heat exchange liquid,
   a heater for the liquid of the reservoir,
   an inlet conduit containing the well stream,
   means indirectly heat exchanging the inlet conduit with the heat exchange liquid of the reservoir,
   means controlling the indirect heat exchange to elevate the well stream temperature to prevent subsequent substantial hydrate formation in the gaseous portion of the well stream when the pressure of the well stream is reduced to pipe line pressure,
   a choke in the inlet conduit,
   means for flowing the high pressure well stream through the choke to reduce the well stream to pipe line pressure,
   a vessel connected to the inlet conduit downstream of the choke to receive the well stream from the choke at pipe line pressure, the vessel providing the capacity in which separation of the gaseous portion of the well stream from the liquid portion containing water takes place,
   a continuous closed conduit connecting upper and lower portions of the reservoir and arranged in heat exchange relation with only the separated liquid portion in the lower portion of the vessel,
   means controlling the flow of reservoir liquid in the closed circuit to regulate the heat exchange between the reservoir liquid to prevent freezing the water in the liquid portion,
   and separate conduits from the vessel to remove the gaseous portion and the liquid portion.

3. A method of producing a predominantly gaseous hydrocarbon high pressure well stream to pipe line pressure including,
   heating a reservoir of heat exchange liquid,
   placing the well stream and reservoir liquid in indirect heat exchange,
   controlling the indirect heat exchange between the well stream and reservoir liquid to prevent subsequent substantial hydrate formation in the gaseous portion of the well stream when the pressure of the well stream is reduced to pipe line pressure,
   reducing the high pressure of the well stream to pipe line pressure,
   introducing the well stream at pipe line pressure into a separator vessel providing the capacity and baffling which will separate the stream into a gaseous portion and a liquid portion containing water,
   passing heated liquid of the reservoir through a continuous closed circuit in indirect heat exchange which is restricted to the separated liquid portion containing water in the lower portion of the separator vessel with the force of thermosiphonic circulation,
   sensing the temperature of the separated liquid portion of the stream in the separator vessel,
   controlling the thermosiphonic circulation of the heated liquid in the continuous closed circuit in accordance with the temperature of the separated liquid portion of the well stream in the separator vessel to prevent freezing the water in the liquid portion, and separately removing the liquid portion and the gaseous portion from the separator vessel.

4. A system for producing a predominantly gaseous hydrocarbon high pressure well stream to pipe line pressure including, a reservoir of heat exchange liquid, a heater for the liquid of the reservoir, an inlet conduit from the well for the well stream, means indirectly heat exchanging the inlet conduit with the heat exchange liquid of the reservoir, means controlling the indirect heat exchange to elevate the well stream temperature to prevent subsequent substantial hydrate formation in the gaseous portion of the well stream when the pressure of the well stream is reduced to pipe line pressure, a choke in the inlet conduit through which the high pressure of the well stream is reduced to pipe line pressure, a vessel connected to the inlet conduit downstream of the choke to receive the well stream from the choke at pipe line pressure and provide the capacity and baffling in which separation of the gaseous portion of the well stream from the liquid portion containing water takes place, a continuous closed conduit connecting upper and lower portions of the reservoir and arranged in heat exchange relation with only the separated liquid portion in the lower portion of the vessel, a valve in the closed conduit, means sensing the temperature of the separated liquid portion of the well stream in the separator vessel and arranged to control the valve in the closed circuit to regulate the reservoir liquid flow so freezing of the water will be prevented, and separate conduits from the vessel to remove the gaseous portion and the liquid portion.

5. A system for producing a predominently gaseous hydrocarbon high pressure well stream to pipe line pressure including, a reservoir of heat exchange liquid, an inlet conduit from the well for the well stream with a section arranged in heat exchange with the reservoir liquid, a bypass valve in the inlet conduit with settings to determine the amount of the well stream flowed through the section of the inlet conduit heat exchanged with the reservoir liquid, means sensing the temperature of the well stream in the inlet conduit downstream of the heat exchange section and arranged to control the bypass valve to elevate the well stream temperature enough to prevent subsequent substantial hydrate formation in the gaseous portion of the well stream when the pressure of the well stream is reduced to pipe line pressure, a choke in the inlet conduit through which the high pressure of the well stream is reduced to pipe line pressure, a vessel connected to the inlet conduit downstream of the choke to receive the well stream from the choke at pipe line pressure and provide the capacity and baffling in which separation of the gaseous portion of the well stream from the liquid portion containing water takes place, a continuous closed conduit connecting upper and lower portions of the reservoir and arranged in heat exchange relation with only the separated liquid portion in the lower portion of the vessel, a valve in the closed conduit, means sensing the temperature of the separated liquid portion of the well stream in the separator vessel and arranged to control the valve in the closed circuit to regulate the reservoir liquid flow so freezing of the water will be prevented, and separate conduits from the vessel to remove the gaseous portion and the liquid portion.

References Cited in the file of this patent

UNITED STATES PATENTS

| | | |
|---|---|---|
| 2,232,948 | Ihrig et al. | Feb. 25, 1941 |
| 2,244,623 | Jones | June 3, 1941 |
| 2,354,932 | Walker et al. | Aug. 1, 1944 |
| 2,758,665 | Francis | Aug. 14, 1956 |
| 2,868,314 | Leuszler et al. | Jan. 13, 1959 |
| 2,990,691 | Glasgow | Juy 4, 1961 |
| 3,012,629 | Walker et al. | Dec. 12, 1961 |